United States Patent [19]

Eriksson

[11] Patent Number: 5,241,882
[45] Date of Patent: Sep. 7, 1993

[54] FILING GAUGE FOR SAW CHAINS
[75] Inventor: Lars O. Eriksson, Edsbyn, Sweden
[73] Assignee: Sandvik AB, Sandviken, Sweden
[21] Appl. No.: 920,559
[22] PCT Filed: Feb. 19, 1991
[86] PCT No.: PCT/SE91/00122
    § 371 Date: Aug. 19, 1992
    § 102(e) Date: Aug. 19, 1992
[87] PCT Pub. No.: WO91/12916
    PCT Pub. Date: Sep. 5, 1991

[30] Foreign Application Priority Data
Feb. 20, 1990 [SE] Sweden .................. 9000601

[51] Int. Cl.$^5$ .................. B23D 63/10
[52] U.S. Cl. .................. 76/36; 33/202
[58] Field of Search .................. 76/36, 31, 80.5; 33/202

[56] References Cited
U.S. PATENT DOCUMENTS

| | | | |
|---|---|---|---|
| 2,508,784 | 5/1950 | Cox | 143/135 |
| 2,662,423 | 12/1953 | Greenlee | 76/36 |
| 2,725,083 | 11/1955 | Ackley | 143/135 |
| 3,905,118 | 9/1975 | Ballew | 76/36 |
| 4,131,038 | 12/1978 | Beerens | 76/25 A |
| 4,228,702 | 10/1980 | Stewart et al. | 76/36 |
| 4,412,463 | 11/1983 | Beerens | 76/36 |
| 4,738,165 | 4/1988 | Gelman | 76/36 |
| 4,745,827 | 5/1988 | Kuwica | 76/36 |

FOREIGN PATENT DOCUMENTS
M83-1578 7/1984 Sweden .

Primary Examiner—Roscoe V. Parker
Attorney, Agent, or Firm—Burns, Doane, Swecker & Mathis

[57] ABSTRACT

Filing gauge for sharpening of a saw chain with cutter (13) and depth gauge (14), comprising a housing (21) which can be located on the saw chain in two angular positions, two parallel shafts (26,27) fixed to the housing, two rollers (28,29) with guiding grooves for a round file slidingly journalled on the shafts, a roller follower (30) slidingly journalled on the shafts without angular mobility and permitting only parallel and simultaneous motion of the rollers, and a guide plate (40) for filing the depth gauge swingably affixed to the housing.

4 Claims, 3 Drawing Sheets

FILING GAUGE FOR SAW CHAINS

FIELD OF USE

Saw chains for chainsaws are most commonly chisel-type, with a cutter formed on a sidelink the upper part of which has been bent perpendicularly to the guidebar and a depth gauge in front of the cutter. Examples of such chains are the U.S. Pat. Nos. 2,508,784 and 2,725,083. Sharpening of the chain is done with a file and comprises three steps: right hand cutters, left hand cutters and depth gauges. Each cutter has one side edge and one transversal edge, both of which can be sharpened simultaneously with a round file. The sharpening operation is relatively simple, but for maximum efficiency and safety the file must be held correctly with respect to height, transversal angle and vertical angle. The depth gauge shall slope slightly forwards, and the difference in height between its peak and the transversal edge shall have a prescribed value. Experience shows that some kind of filing gauge is needed for these operations, and numerous types of filing gauges have been suggested.

Accuracy in filing is the most important requirement for a filing gauge, but other demands are that filing should be possible with one hand on the file without holding the filing gauge, and that the file should be supported by rollers at least when sharpening the edges to avoid excessive wear, and that the position of the filing gauge should be determined by the chain rather than by the guide bar, with consideration of the play of the saw chain in the groove on the guide bar.

PRIOR ART

Filing gauges where the file is guided by rollers are known from the U.S. Pat. No. 4,131,038, comprising a channel laid over at least two cutter links, an indexable angular plate which is adjusted to the desired transversal angle according to a scale and one springloaded plate movable against the angular plate and carrying two guide roller with axes parallel to the flat sides of the guide bar. Disadvantages with this type of filing gauge are the need for resetting the angular plate when proceeding from right hand cutters to left hand cutters, an intricate design with numerous components and lacking control of the vertical angle.

The U.S. Pat. No. 4,228,702 describes a filing gauge with four rollers, with no need for readjustment between right and left hand, but this is also mechanically intricate with several springs, and is to be affixed to the guide bar with screw clamps, which makes control of the vertical angle impossible.

Filing gauges oriented by the saw chain links are known from the U.S. Pat. No. 4,745,827, where a support plate is secured to the saw chain by two narrow prongs inserted between the pairs of sidelinks in front and rear of the cutter link. The transversal angle is estimated with aid of sighting lines and the vertical angle is determined by the support plate. One disadvantage is that the file will rub against the support plate with great force when filing the edges, which wears the file and the plate excessively.

A filing gauge according to the U.S. Pat. No. 4,738,165 has a support plate oriented by the saw chain by cutouts in contact with the outside of the pairs of sidelinks in front and rear of of the cutting link. The entire support plate is sloping slightly in the longitudinal direction of the chain, thereby assuring a desired relation between the transversal and vertical angles. There is no guidance for the transversal angle, however, and the file rubs against the plate when filing the edges. A parallel row of holes in the same support plate is used in filing the depth gauge.

The present invention concerns a filing gauge which facilitates filing the cutter with controlled transversal and vertical angles, and with minimal wear of the file, and also filing of the depth gauge with the optimal slope.

DESCRIPTION OF THE PREFERRED EMBODIMENT

Figure 1:
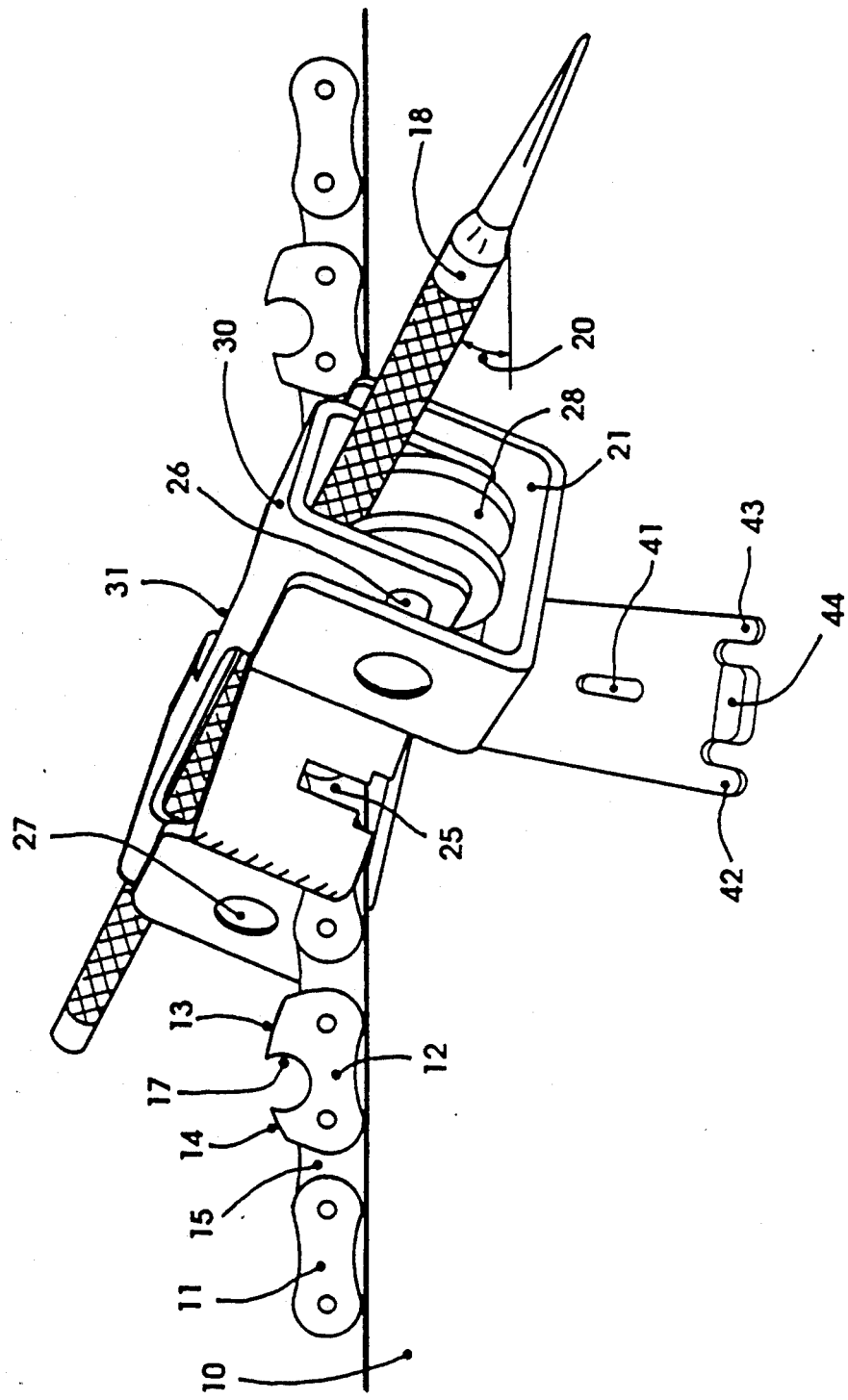
FIGS. 1 and 2 show the filing gauge when used in filing the cutter of a cutter link,
FIG. 3 when used in filing the depth gauge and
FIG. 4 a view in the direction of the file.
Figure 2:
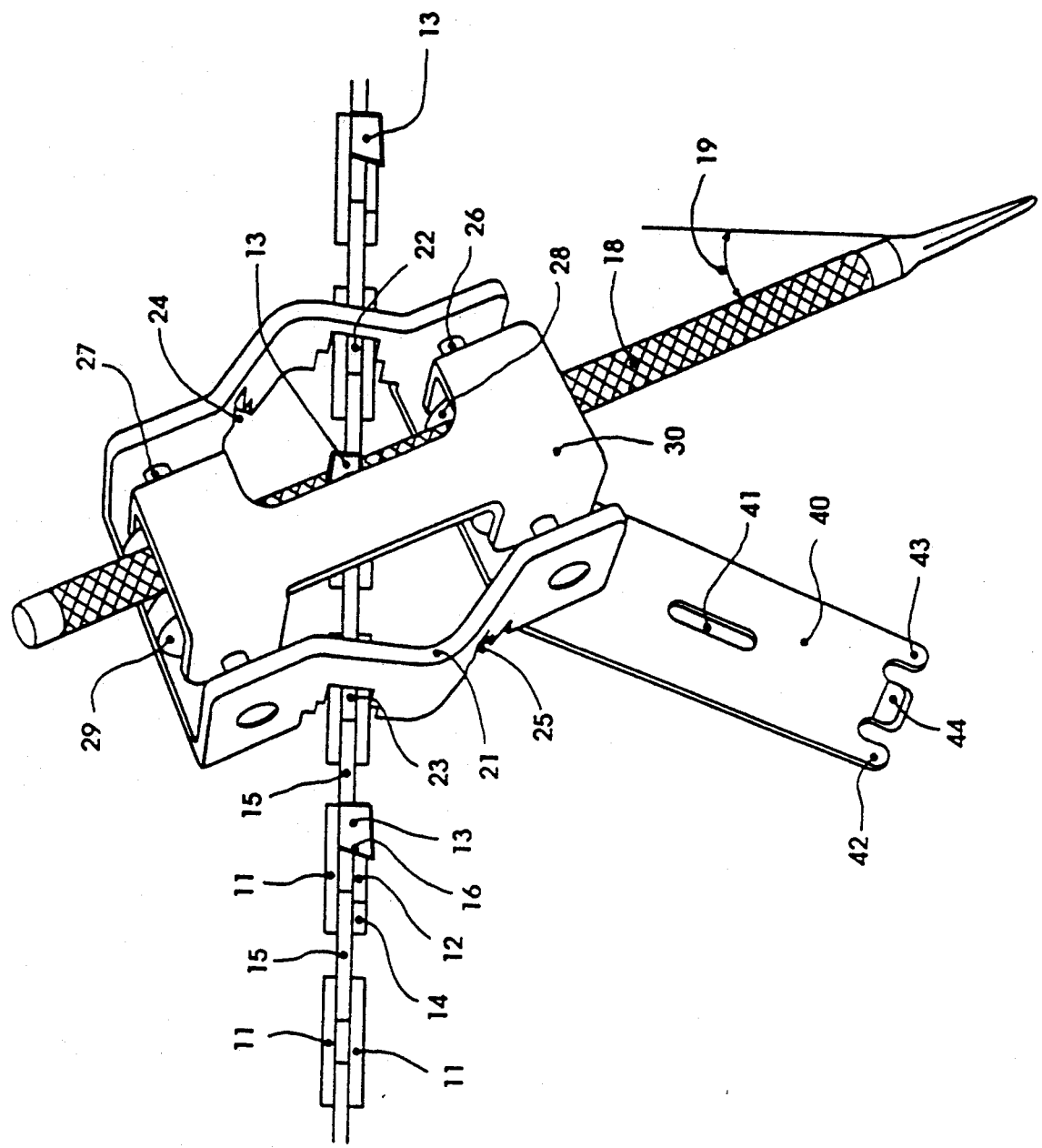
Figure 3:
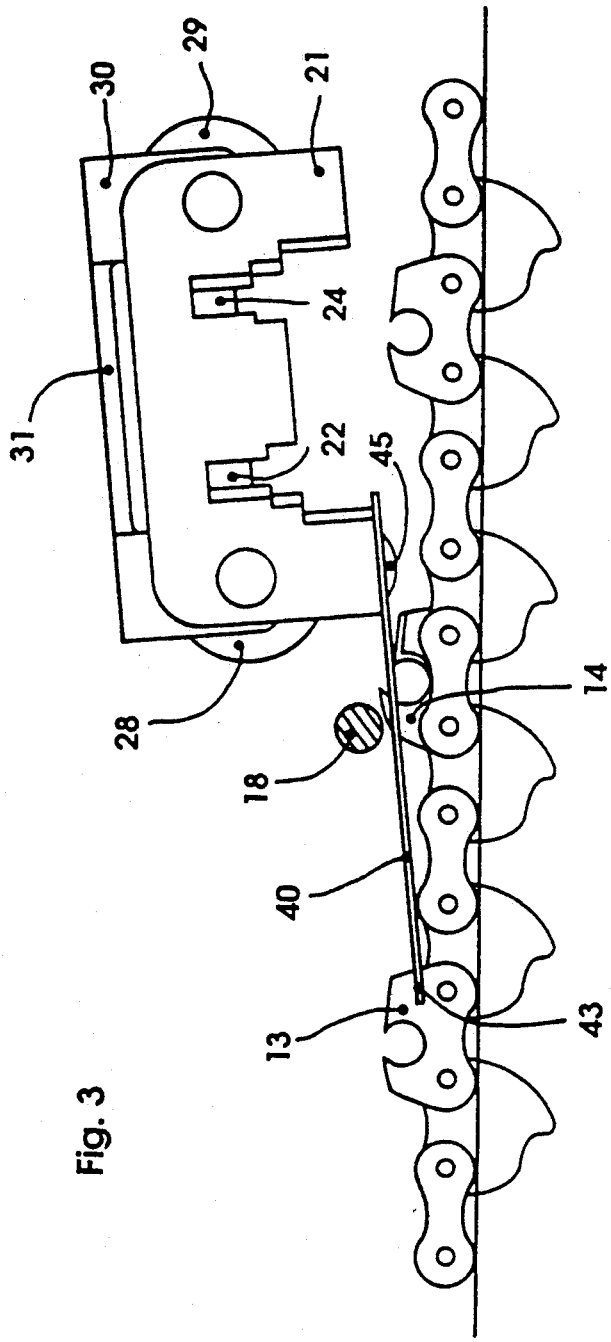
Figure 4:
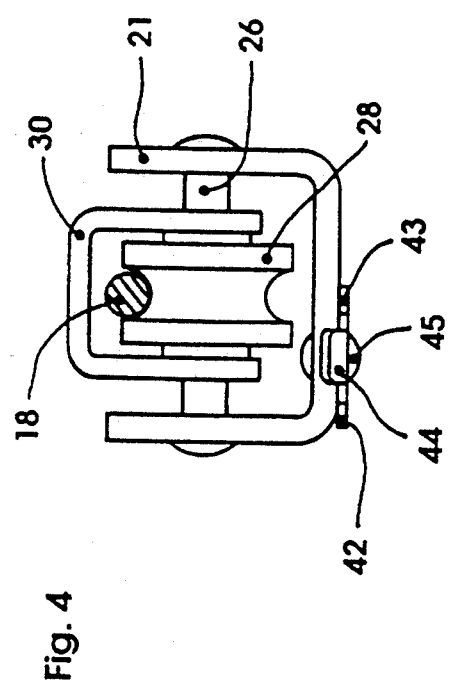

The saw chain runs around the guide bar (10) and comprises drivelinks (15) running in a groove on the guide bar, sidelinks (11) and cutter links (12). The cutter links (12) carry in front a depth gauge (14) and in rear a folded-over flat cutter (13). The cutter has an edge comprising two portions, one transversal edge (16) and one side edge (17), both of which can be sharpened simultaneously by filing with a round file (18). For safe and efficient sawing the round file (18) shall be moved with a combination of transversal angle (19) and vertical angle (20) characteristic for each model of chain. Normal values are 25 to 35 degrees for the transversal angle (19) and 0 to 10 degrees for the vertical angle (20).

The filing gauge comprises a housing (21) which can be placed upon the chain, where it is located by two cutouts (22,23) in the lower sides when used for filing a right hand cutter, said cutouts having parallel faces and such a width that they can be pushed down over a pair of sidelinks (11) without play. The cutout (22) facing rearwards towards the motor is deeper than the cutout (23) facing forwards towards the guide bar nose, giving the housing (21) a slope in the direction of the file corresponding to the desired vertical angle (20). The direction and position of the cutouts (22,23) are such that the transversal angle (19) of the round file (18) is what is recommended for the type of chain. In the lower sides are also two more cutouts (24,25) to be used in the same manner when filing a left hand cutter. The sides of the housing are preferrentially curved to make the cutouts locally perpendicular to the sides and possible to make by punching.

The upper face of the cutouts (22,23,24,25) is straight if the filing gauge is to be used only with chains where all sidelinks (11) are equal, or deeper to one side for use also with chains where one sidelink of the pair is a raised safety link as in U.S. Pat. No. 4,558,621.

Two shafts (26,27) run between the sides of the housing (21) with ends riveted in place. On the shafts two rollers (28,29) are journalled, with deep guiding grooves corresponding to the cross-section of the round file (18). The rollers (28,29) are freely slideable on the shafts (26,27) when moving together in parallel, constrained by a roller follower (30) which is journalled on the shafts (26,27) in such a way that it can slide along the shafts but not change its angle relative to the shafts, for instance by bearing holes on both sides of the rollers. When the edge (13) is filed the round file (18) is translated sideways without change in vertical angle (20) and transversal angle (19) making it possible to apply full force when the file is moved forward, and no force when it is moving backwards. In the upper surface of the roller follower (30) is a broad opening (31) which permits observation of the cutter (13) during filing. The roller follower (30) and the housing (21) are not perpendicular to the guide bar, but are sloping both crosswise and lengthwise relative to the guide bar.

On the underside of the housing (21) is affixed a guide plate (40) with three tongues (42,43,44) at its extremity, to be used as a guide for filing the depth gauge (14). When doing this, the middle tongue (44) which is bent upwards, is inserted below the flat cutter (13) of the preceding cutter link, with one of the straight tongues (42,43) on the outside of the cutter. The depth gauge (14) will then fit through a slot (41) and the overstanding part, if any, is removed with a round (18) or a flat file. The thickness of the guide plate (40) is so chosen that it will flex without wear when the depth gauge (14) is filed level with the guide plate (40), and so that the depth gauge (14) has then the height required for the desired chip thickness. The guide plate is swingably affixed with a rivet or a screw (45) so that it can be swung aside when filing the cutter (13) or against the housing (21) when stowed away.

I claim:

1. Filing gauge for filing a saw chain with cutter and depth gauge, comprising a housing (21) which can be removably located on the saw chain, two parallel shafts 28,29 fixed to the housing, and two rollers provided with peripheral grooves with a section fitting a round file and slidingly movable on the shafts, characterized by having the rollers coupled by a mechanical coupling, permitting only parallel and simultaneous motion of the rollers in the direction of the shafts.

2. Filing gauge according to claim 1, characterized by having the rollers coupled by a roller follower which is slidably journalled on the shafts without angular mobility.

3. Filing gauge according to claim 2, characterized by having means to locate the housing in two angular positions relative to the saw chain, said means being for each position two cutouts with parallel sides supportable against the saw chain.

4. Filing gauge according to claim 3, characterized by having a guide plate with a slot fitting to the depth gauge of the saw chain swingably affixed to the housing.

* * * * *

UNITED STATES PATENT AND TRADEMARK OFFICE
CERTIFICATE OF CORRECTION

PATENT NO. : 5,241,882

DATED : September 7, 1993

INVENTOR(S) : Lars O. ERIKSSON

It is certified that error appears in the above-indentified patent and that said Letters Patent is hereby corrected as shown below:

In Column 4, line 5, delete "(21)".

In Column 4, line 7, delete "(28,29)".

Signed and Sealed this

Twenty-sixth Day of April, 1994

Attest:

BRUCE LEHMAN

*Attesting Officer*  *Commissioner of Patents and Trademarks*